US007518981B1

(12) United States Patent
Young et al.

(10) Patent No.: US 7,518,981 B1
(45) Date of Patent: Apr. 14, 2009

(54) METHOD AND SYSTEM FOR A GRACEFUL REROUTE OF CONNECTIONS ON A LINK

(75) Inventors: Thomas S. Young, San Carlos, CA (US); William P. Buckley, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1274 days.

(21) Appl. No.: 09/792,676

(22) Filed: Feb. 23, 2001

(51) Int. Cl.
*H04L 12/28* (2006.01)
*G06F 15/173* (2006.01)
*G06F 11/00* (2006.01)

(52) U.S. Cl. ....................... 370/216; 370/400; 709/239; 714/4

(58) Field of Classification Search ................. 370/225, 370/227, 228, 231, 237
See application file for complete search history.

(56) References Cited

U.S. PATENT DOCUMENTS 5,781,529 A 7/1998 Liang et al.
5,854,899 A 12/1998 Callon et al.
5,933,412 A 8/1999 Choudhury et al.
6,070,192 A * 5/2000 Holt et al. ................... 709/227
6,111,881 A * 8/2000 Soncodi ................. 370/395.32
6,115,753 A 9/2000 Joens
6,141,325 A 10/2000 Gerstel
6,154,444 A 11/2000 Masuo et al.
6,167,025 A 12/2000 Hsing et al.
6,262,984 B1 7/2001 Rochberger
6,272,107 B1 8/2001 Rochberger et al.
6,272,139 B1 * 8/2001 Soncodi ................... 370/241.1
6,301,267 B1 10/2001 Ben-Ami
6,304,549 B1 10/2001 Srinivasan et al.
6,389,128 B1 * 5/2002 Stademann ............ 379/221.01
6,434,612 B1 8/2002 Hughes et al.
6,487,204 B1 11/2002 Dacier et al.
6,496,941 B1 * 12/2002 Segal et al. .................... 714/4
6,529,498 B1 3/2003 Cheng
6,535,481 B1 * 3/2003 Andersson et al. .......... 370/225
6,594,235 B1 * 7/2003 Rochberger et al. ......... 370/238
6,614,757 B1 * 9/2003 Rochberger et al. ......... 370/231
6,614,762 B1 9/2003 Illiadis et al.
6,633,544 B1 10/2003 Rexford et al.
6,654,361 B1 * 11/2003 Dommety et al. ........... 370/331
6,687,230 B1 * 2/2004 Furutono et al. ............ 370/238
6,735,176 B1 * 5/2004 So ............................. 370/237
6,744,734 B1 6/2004 Iliadis et al.
2004/0202112 A1 * 10/2004 McAllister et al. .......... 370/252

* cited by examiner

*Primary Examiner*—Melvin Marcelo
*Assistant Examiner*—Clemence Han
(74) *Attorney, Agent, or Firm*—Blakely, Sokoloff, Taylor & Zafman LLP

(57) ABSTRACT

A method and system for a graceful reroute of connections on a link are described. According to one embodiment, in a digital communications network, a method comprises blocking new connections from being established over a link. Old connections are rerouted around the link; and the link is taken out of service.

32 Claims, 5 Drawing Sheets

430

START — 501

Send Trace message to master nodes — 510

Upon receiving trace message, master nodes initiate rerouting of connections — 520

Wait for Connections to be released — 530

STOP — 540

220

METHOD AND SYSTEM FOR A GRACEFUL REROUTE OF CONNECTIONS ON A LINK

FIELD OF THE INVENTION

The present invention pertains to communications and networking. More particularly, the invention relates to the usage of resources in networking devices.

BACKGROUND OF THE INVENTION

Wide-area networking systems serviced by ATM (Asynchronous Transfer Mode) have multiple nodes that are interconnected by high-speed data links. Each network has a plurality of nodes, which may each contain switching devices that regulate data traffic to user equipment. User equipment may be connected to the nodes.

Each node has a controller device and switch, which facilitate the calls through the node. The controller has processing, memory, and other resources to interpret, forward, and process messages and initiate other messages as appropriate, while the switch ordinarily handles the physical routing of messages among nodes and user terminals.

In a redundant high-availability private network-to-network interface ("PNNI") routing protocol implementation, a redundant pair of controllers is used in the case of controller failure. Thus, each node has two controllers, one primary and one secondary. In order to ensure proper functioning, it is desirable to perform maintenance and testing on the links.

SUMMARY OF THE INVENTION

What is disclosed is a method and system for a graceful reroute of connections on a link. According to one embodiment, in a digital communications network, a method comprises blocking new connections from being established over a link. Existing connections are rerouted around the link; and the link is taken out of service.

Other features and advantages of the present invention will be apparent from the accompanying drawings and from the detailed description that follows below.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

What is disclosed is a method and system for the graceful reroute of connections on a link. According to one embodiment, in a digital communications network, a method comprises blocking new connections from being established over a link. Existing connections are rerouted around the link; and the link is taken out of service. The present techniques provide a single command that gracefully reroutes all traffic (data) off of a given link such that maintenance or diagnostics may be performed on that link. A single command may be used to initiate the rerouting with a trace message rather than manually rerouting.

Figure 1:
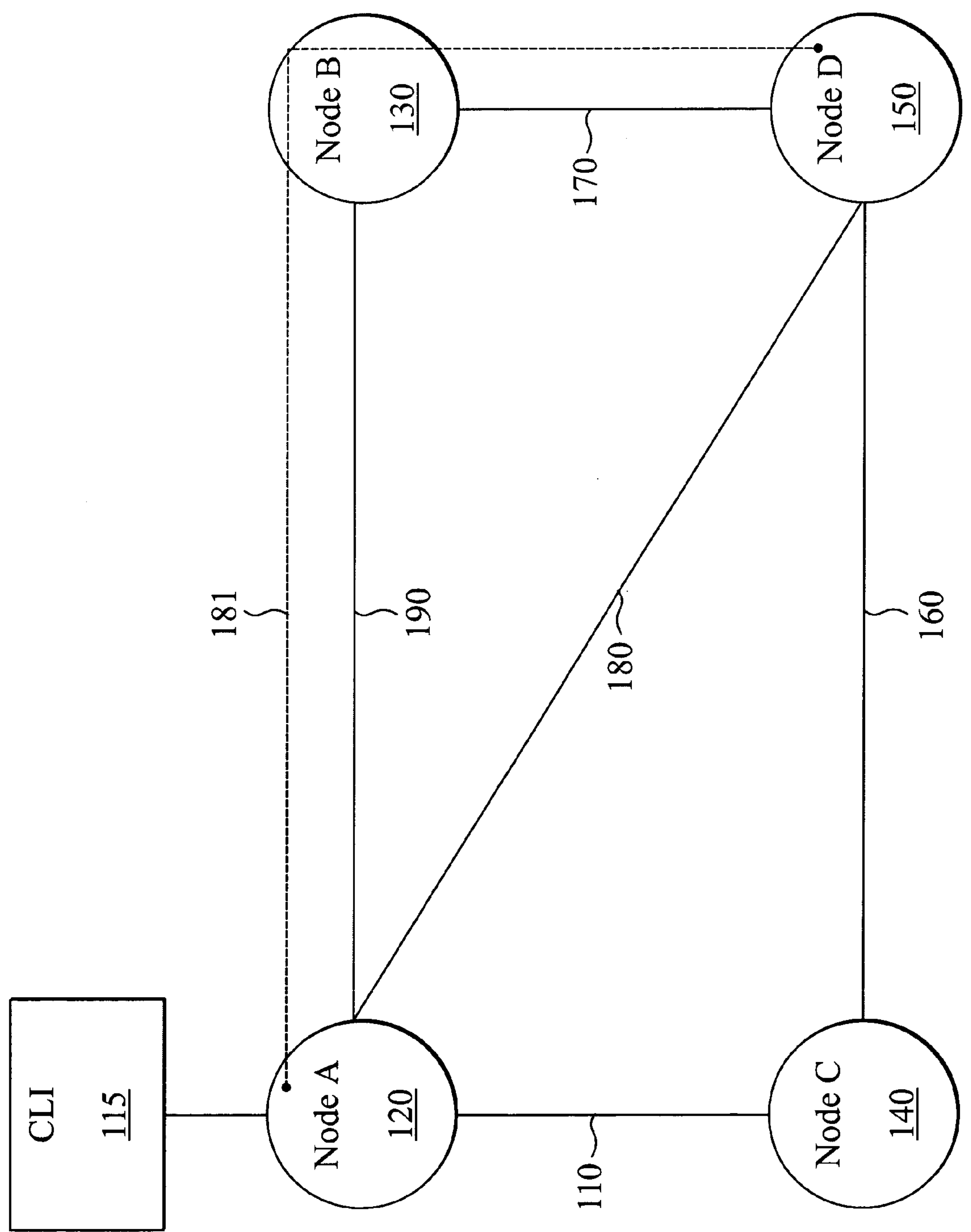
FIG. 1 illustrates a PNNI (Private Network-to-Network Interface) system implementing elements of the present invention.

FIG. 1 illustrates a PNNI (Private Network-to-Network Interface) system 100 implementing elements of the present invention. System 100 includes multiple nodes, such as nodes 120-150. Nodes 120-150 may be high-speed data switches, such as those manufactured by Cisco Systems, Inc. of San Jose, Calif. Each node 120-150 includes a command line interface (CLI) 115 attached to the node. The CLI 115 allows a network operator to control functions and perform diagnostics and maintenance on the node.

Nodes 120-150 may be interconnected by links (also called trunks), such as links 110, 160, 170, 180, 190. The link may be a high speed data line such as a T3, E3, or OC3 line. Links 110, 160, 170, 180, 190 may also be virtual links spanning multiple nodes, however the user will only see the end nodes. A virtual path for data transmission between one node and another is called a connection. For example, connection 181, although passing through Node B 130, is a virtual path for data transmission between Node A 120 and Node D 150. There may be thousands of connections carried on each link.

Figure 2:
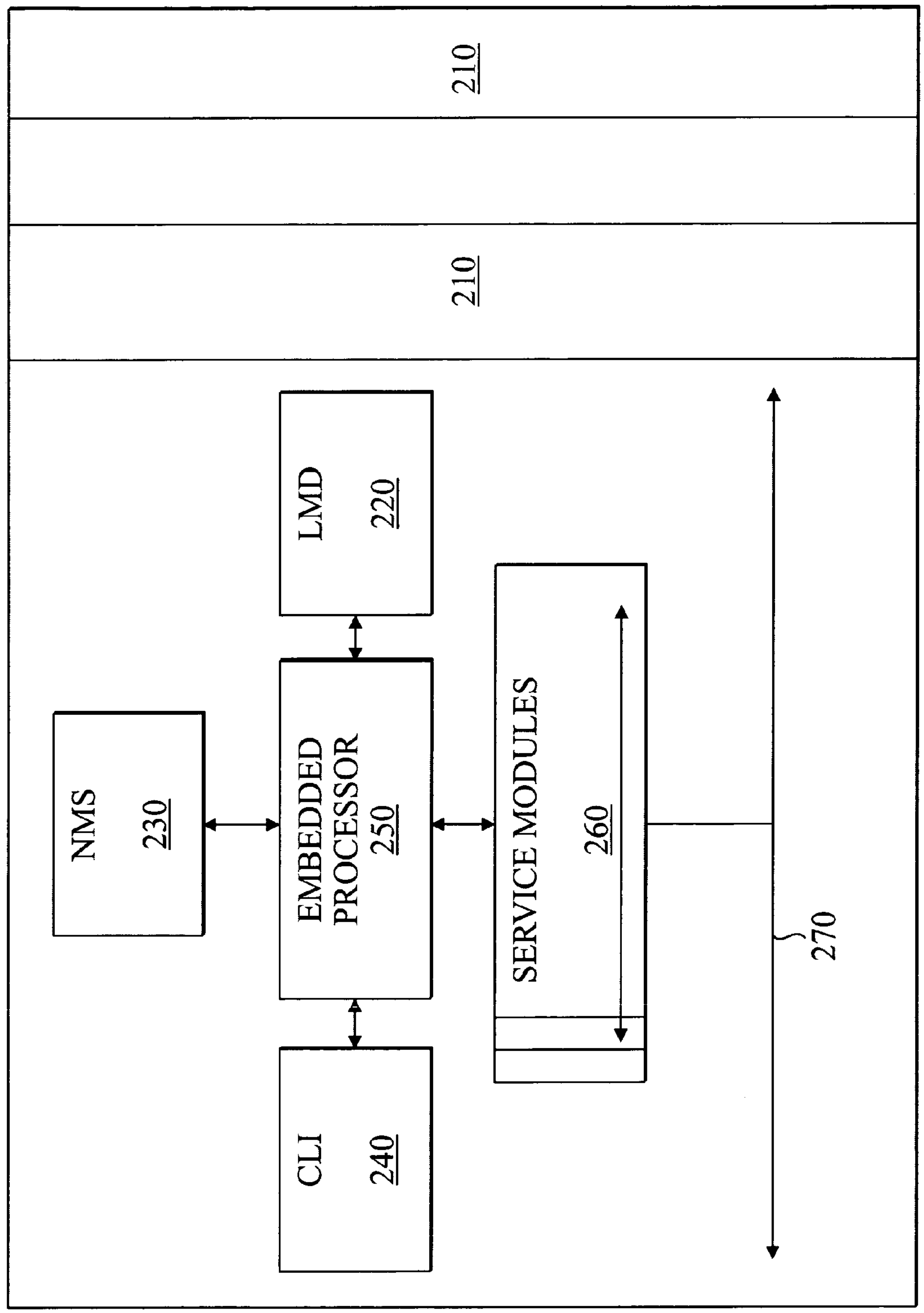
FIG. 2 illustrates a switch, used to implement elements of the present invention.

FIG. 2 illustrates a switch 200, used to implement elements of the present invention. Switch 200 includes numerous line cards 210, a link maintenance device (LMD) 220, a network management system (NMS) 230, a CLI interface 240, an embedded processor 250, and service modules 260. LMD 220, NMS 230, CLI 240, and Service Modules 260 are all connected to the embedded processor 250. Connected to the Service Modules 260 are cables 270 that connect switch 200 to other nodes. Embedded processor 250 runs various software functions. LMD 220 performs a Link Maintenance Function. Thus, both hardware and software implementations of the present techniques are contemplated to be within the scope of the present invention, and wherever LMD 220 is described, a link maintenance software function is also contemplated. The CLI interface 240 connects to CLI 115. NMS 230 monitors all links for their proper operation and signals users of problems with a link.

Link maintenance device 220 allows for the locking and graceful rerouting of connections off a link. The embedded processor 250 controls the various operations and elements of the switch 200.

Figure 3:
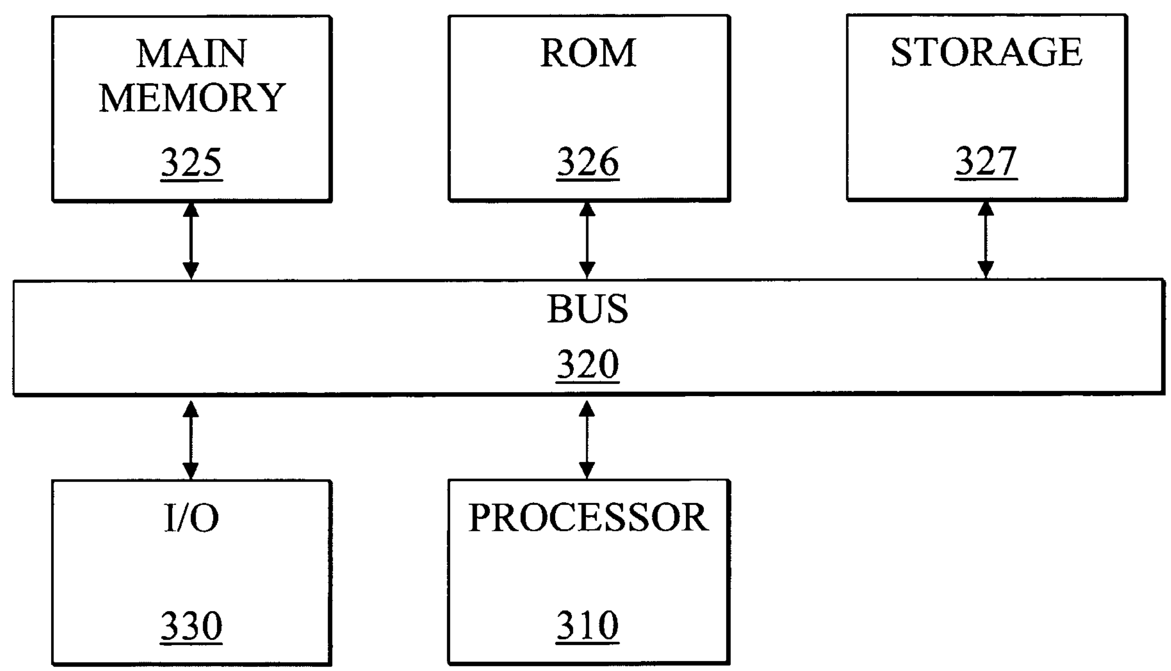
FIG. 3 illustrates a functional block diagram of truck maintenance device.

FIG. 3 illustrates a functional block diagram of link maintenance device 220. One embodiment of device 220 comprises a system bus 320 for communicating information, and a processor 310 coupled to bus 320 for receiving messages from line cards 210 and terminating commands carried in the messages. Device 220 further comprises a random access memory (RAM) or other dynamic storage device 225 (referred to herein as main memory), coupled to bus 320 for storing information and instructions to be executed by processor 310. Main memory 325 also may be used for storing temporary variables or other intermediate information during execution of instructions by processor 310. Computer system 300 also may include a read only memory (ROM) and/or other static storage device 326 coupled to bus 320 for storing static information and instructions used by processor 310.

A data storage device 327 such as a magnetic disk or optical disc and its corresponding drive may also be coupled to computer architecture 300 for storing information and instructions.

Figure 4:
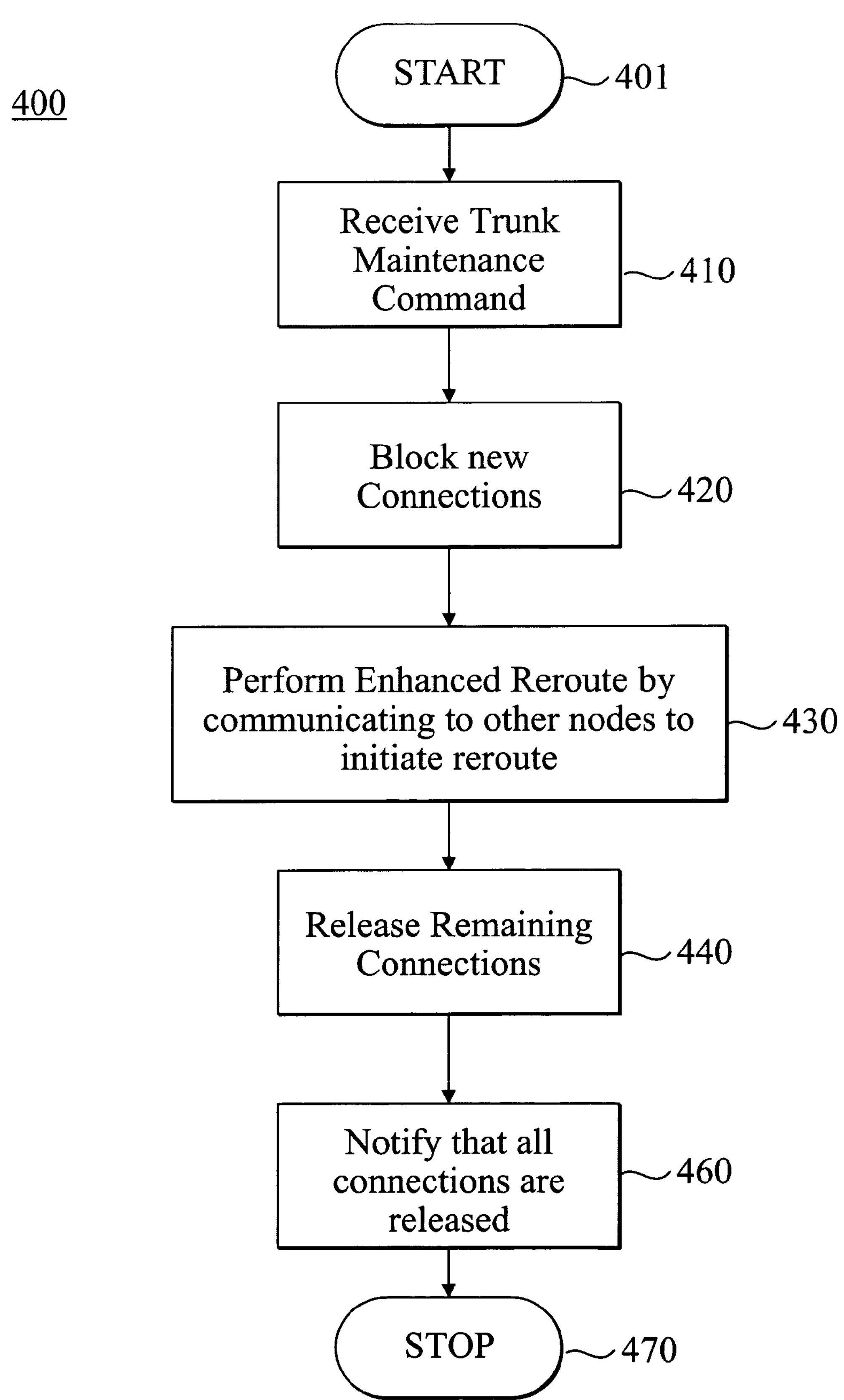
FIG. 4 illustrates a flow diagram of the process carried out by link maintenance device.

FIG. 4 illustrates a flow diagram of the process 400 carried out by link maintenance device 220. For example, a user may wish to gracefully remove all connections from link 180, which connects node A 120 and node D 150. In this example node A 120 is the master node which established and initialized link 180. The process starts at block 401. At processing block 410, device 220 receives a link maintenance command. The device 220 may receive the command from a user through CLI 115, via a simple network management protocol (SNMP) command, or similar user input protocol.

At processing block 420, device 220 blocks new connections from being established across the link, which it controls. In one embodiment, the connections are blocked by setting a standard PNNI parameter, called availCR (available cell rate) equal to 0. By setting availCR=0, the node advertises that the available cell rate is zero, such that the link is not available for new connections to be established. This causes the PNNI Topology State Element (PTSE) to be broadcast throughout the network, also known as flooding. The PTSE is a data block that tells other nodes what resources are available across the link. Device 220 waits for this "flooding" to be absorbed by other nodes in network 100. Thus, in the example above, no new connections are allowed across link 180. However, the connections already established and operating on link 180 must be removed.

At processing block 430, enhanced rerouting is performed on the established connections by communicating to surrounding nodes that a reroute of connections should be initiated. Rerouting establishes a new virtual path through the network for the existing connection over the link. Block 430 will be described below in greater detail in conjunction with FIG. 5. At processing block 440, any remaining connections are released. For example, any connections not released at block 430 will be released by block 440 using a release command. These connections may be released using standard PNNI release commands. A throttled rate of M connections per second is used to release the connections off the link so that the other nodes can absorb and reroute the released connections. The rate "M" may be changed by the user at any time during the release process.

At processing block 460, device 220 sends a notification that all connections have been removed from the link. The notification may be in the form of a confirmation signal to a user via CLI 115, SNMP trap, or similar event. The process ends at block 470.

Figure 5:
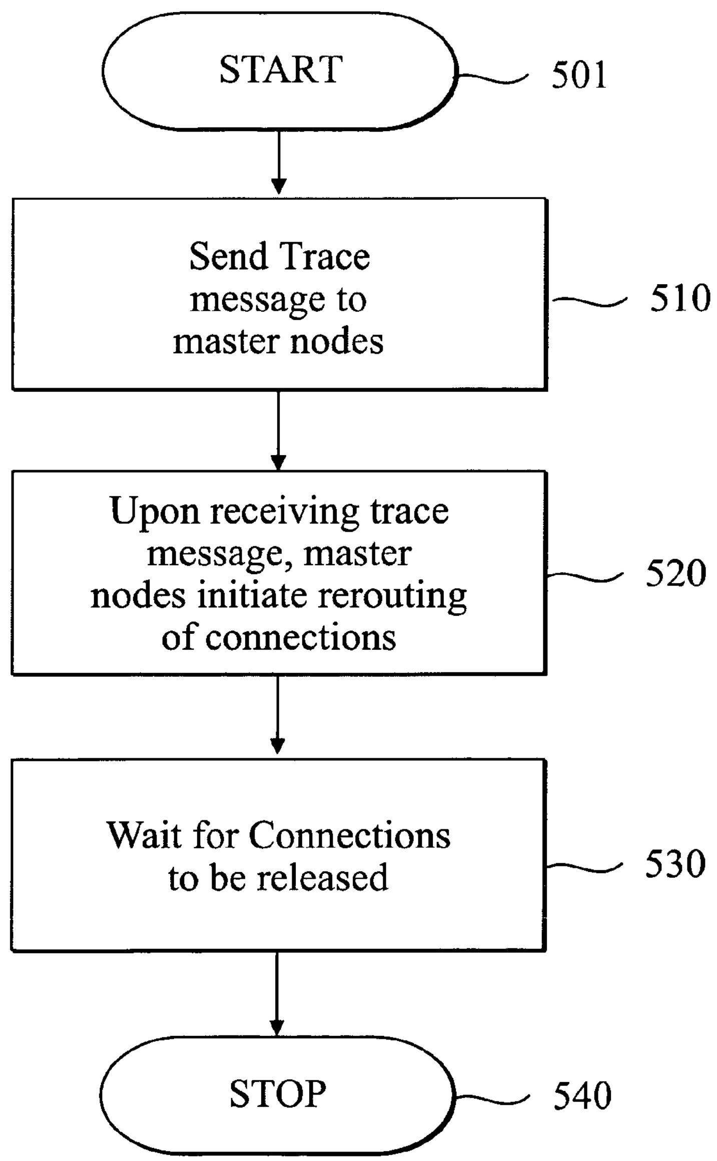
FIG. 5 illustrates a flow diagram of the process for rerouting.

FIG. 5 illustrates a flow diagram of the process 430 for rerouting according to the present techniques. The process begins at block 501. Process 430 makes new connections using alternate paths between nodes before breaking the established connections on the link.

These connections are processed at a throttled rate of K connections per second. The rate K may be specified by the use when the LMD is initiated. The rate K may be any rate which allows for hitless operation, that is the service outage caused by process 400 is less than 200 mSec.

At processing block 510 a trace message (standard PNNI signaling) is sent across both ends of the link that will be serviced. The trace command is sent to each connection's master node, that is the node that established the connection for the first time and the only node that may initiate a reroute for that connection. The standard PNNI trace command includes a proprietary field which may be coded to include instructions for a master node to reroute its connections. The trace command may be used because it is routed to the endpoints of each connection.

Thus, at processing block 520, upon receiving the trace message, a master node may initiate the rerouting of any connections it established over the link that will be serviced. At any time during the reroute process, a user may adjust the reroute rate "K" to a desired rate. At processing block 530, device 220 waits "L" seconds for the connections to reroute. If the calls are rerouted before L seconds lapse, then the process stops at block 540.

In one embodiment, link maintenance device 220 may be used to throttle back connections on a link to make more bandwidth available, without removing all connections from the link.

The link maintenance device 220, is always available for use, however, periods of low network activity is best for performing maintenance on a link.

In one embodiment, the link maintenance device 220 works in networks, in which other nodes do not have such a device, as well. Not all nodes in the network are required to support the Link Maintenance Function in order for the function to be used on a node that does support the function.

The maintenance device 220 minimizes connection outages, without:

disrupting service, including data loss or downed time;

manually rerouting connections;

back-logging normal provisioning (the establishment of new connections);

establishing new messaging, since only existing PNNI commands are used, and establishing new inter-node mechanisms.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawing are, accordingly, to be regarded in an illustrative rather than a restrictive manner.

We claim:

1. In a digital communications network, a method comprising:

blocking new connections from being established over a link;

rerouting old connections around the link comprising sending a request to each master node associated with the old connections;

rerouting the old connections at a user defined reroute rate based on the request;

adjusting the reroute rate to a different desired user defined rate for rerouting the old connections;

waiting up to a time period for the old connections to be rerouted;

releasing old connections that are not rerouted before the time period lapses; and taking the link out of service, wherein the request is part of a trace message.

2. The method of claim 1, further comprising releasing the old connections at a third user defined rate from the link.

3. The method of claim 2, further comprising notifying a user when the old connections are released.

4. The method of claim 1, wherein blocking comprises receiving a command from a user through a command line interface.

5. The method of claim 4, wherein the command is received using a simple network management protocol.

6. The method of claim 4, wherein blocking further comprises waiting up to an available cell rate parameter equal to zero.

7. The method of claim 6, wherein blocking further comprises:

flooding the network; and waiting for the flooding to be absorbed by other nodes in the network.

8. The method of claim 1, wherein the rerouting of old connections around the link is performed after the blocking of new connections.

9. The method of claim 1, wherein blocking new connections, comprises:

advertising that there is no available bandwidth on the link; and waiting for the new connections to be rerouted around the link.

10. The method of claim 9, further comprising sending a reroute request at a first user defined rate to master nodes, wherein the master nodes are associated with the old connections.

11. The method of claim 10, further comprising sending the reroute request across both ends of the link at a second user defined rate.

12. In a digital communications network, a system comprising:

means for blocking new connections from being established over a link;

means for rerouting old connections around the link comprising means for sending a request by a master node and adjusting a user defined reroute rate to a different desired user defined rate for rerouting the old connections;

means for waiting up to a time period for the old connections to be rerouted;

means for releasing old connections that are not rerouted before the time period lapses; and means for taking the link out of service, wherein the request is part of a trace message.

13. The system of claim 12, further comprising means for releasing the old connections at a third user defined rate from the link.

14. The system of claim 13, further comprising means for notifying a user when the old connections are released.

15. The system of claim 12, wherein blocking new connections, comprises:

means for advertising that there is no available bandwidth on the link; and means for waiting for the new connections to be rerouted around the link.

16. The system of claim 15, further comprising means for sending a reroute request at a first user defined rate to master nodes, wherein the master nodes are associated with the old connections.

17. The system of claim 16, further comprising means for sending the reroute request across both ends of the link at a second user defined rate.

18. A computer-readable medium having stored thereon a plurality of instructions, said plurality of instructions when executed by a processor, cause said processor to perform the following comprising:

blocking new connections from being established over a link;

rerouting old connections around the link comprising sending a request to each master node associated with the old connections;

rerouting the old connections at a user defined reroute rate based on the request;

adjusting the reroute rate to a different desired user defined rate for rerouting the old connections;

waiting up to a time period for the old connections to be rerouted;

releasing old connections that are not rerouted before the time period lapses; and taking the link out of service, wherein the request is part of a trace message.

19. The computer-readable medium of claim 18 having stored thereon additional instructions, said additional instructions when executed by the processor, cause said processor to further perform releasing the old connections at a third user defined rate from the link.

20. The computer-readable medium of claim 19 having stored thereon additional instructions, said additional instructions when executed by the processor, cause said processor to further perform notifying a user when the old connections are released.

21. The computer-readable medium of claim 18 having stored thereon additional instructions, said additional instructions when executed by the processor, cause said processor to further perform:

advertising that there is no available bandwidth on the link; and waiting for the new connections to be rerouted around the link.

22. The computer-readable medium of claim 21 having stored thereon additional instructions, said additional instructions when executed by the processor, cause said processor to further perform sending a reroute request at a first user defined rate to master nodes, wherein the master nodes are associated with the old connections.

23. The computer-readable medium of claim 22 having stored thereon additional instructions, said additional instructions when executed by the processor, cause said processor to further perform sending the reroute request across both ends of the link at a second user defined rate.

24. In a digital communications network, a switch comprising:

a plurality of line cards connected to the switch;

a network management system connected to the switch;

a command line interface connected to the switch; and a link maintenance device connected to the switch, wherein the link maintenance device blocks new connections from being established over the link, and reroutes old connections around the link comprising sending a request to each master node associated with the old connections;

rerouting the old connections at a user defined reroute rate based on the request;

adjusting the reroute rate to a different desired user defined rate for rerouting the old connections;

waiting up to a time period for the old connections to be rerouted; and releasing old connections that are not rerouted before the time period lapses, wherein the request is part of a trace message.

25. The switch of claim 24, wherein the switch advertises that there is no available bandwidth on the link and waits for new connections to be established around the link.

26. The switch of claim 25, wherein the switch sends a reroute request at a first user defined rate to master nodes, wherein the master nodes are associated with the old connections.

27. The switch of claim 26, wherein the switch releases the old connections at a third user defined rate off the link.

28. A network operation method, comprising:

sending a message from a link to a master node; and upon receiving the message by the master node, rerouting an old connection between the master node and the link, wherein rerouting comprises:

sending a request to each master node associated with the old connections;

rerouting the old connections at a user defined reroute rate based on the request;

adjusting the reroute rate to a different desired user defined rate for rerouting the old connections;

waiting up to a time period for the old connections to be rerouted; and releasing old connections that are not rerouted before the time period lapses.

29. The method of claim 28, wherein the message is a trace message.

30. The method of claim 28, further comprising blocking new connections from being established across the link by waiting up to an available cell rate parameter equal to zero.

31. The method of claim 28, further comprising:

receiving a link maintenance command by the master node from a user;

blocking a new connection from being established across the link by the master node; and performing the sending step and rerouting step after the blocking step.

32. The method of claim 31, further comprising:

releasing any remaining old connections using a release command by the master node; and sending a notification to the user that all connections have been removed from the link by the master node.

* * * * *